(12) United States Patent
Austin et al.

(10) Patent No.: US 9,177,237 B2
(45) Date of Patent: Nov. 3, 2015

(54) COMPUTER DEVICE AND METHOD FOR ISOLATING UNTRUSTED CONTENT

(71) Applicant: Avecto Limited, Cheadle, Cheshire (GB)

(72) Inventors: Mark Austin, Manchester (GB); John Goodridge, Cheshire (GB)

(73) Assignee: AVECTO LIMITED, Cheadle, Cheshire (GB)

( * ) Notice: Subject to any disclaimer, the term of this patent is extended or adjusted under 35 U.S.C. 154(b) by 0 days.

(21) Appl. No.: 14/520,208

(22) Filed: Oct. 21, 2014

(65) Prior Publication Data

US 2015/0146231 A1    May 28, 2015

(30) Foreign Application Priority Data

| Oct. 23, 2013 | (GB) | 1318723.2 |
| Nov. 15, 2013 | (GB) | 1320212.2 |
| Oct. 20, 2014 | (GB) | 1418629.0 |
| Oct. 20, 2014 | (GB) | 1418631.6 |
| Oct. 20, 2014 | (GB) | 1418632.4 |

(51) Int. Cl.

| G06K 15/00 | (2006.01) |
| G06F 3/12 | (2006.01) |
| G06F 21/53 | (2013.01) |
| G06F 21/56 | (2013.01) |
| G06F 21/62 | (2013.01) |
| G06F 9/48 | (2006.01) |
| G06F 17/30 | (2006.01) |

(52) U.S. Cl.
CPC .......... *G06K 15/4095* (2013.01); *G06F 3/1222* (2013.01); *G06F 9/4812* (2013.01); *G06F 17/30144* (2013.01); *G06F 21/53* (2013.01); *G06F 21/566* (2013.01); *G06F 21/6209* (2013.01); *G06F 2221/03* (2013.01)

(58) Field of Classification Search
None
See application file for complete search history.

(56) References Cited

U.S. PATENT DOCUMENTS

| 7,797,727 | B1 | 9/2010 | Miller et al. |
| 2003/0233544 | A1 | 12/2003 | Erlingsson |
| 2004/0006706 | A1 | 1/2004 | Erlingsson |
| 2005/0149726 | A1* | 7/2005 | Joshi et al. .................... 713/164 |
| 2007/0050369 | A1 | 3/2007 | Stiegler et al. |
| 2010/0175104 | A1 | 7/2010 | Khalid |

OTHER PUBLICATIONS

U.S. Appl. No. 14/520,221, Mark Austin, et al.
U.S. Appl. No. 14/520,220, Mark Austin, et al.

* cited by examiner

*Primary Examiner* — Thomas D Lee
(74) *Attorney, Agent, or Firm* — Knobbe Martens Olson & Bear LLP

(57) ABSTRACT

A computer system and method are provided to intercept a task from a primary user account 121 prior to execution of the task by the computer device 200, where the task relates to an untrusted content. A task isolation environment 350 is provisioned for executing the task, including programmatically creating a secondary user account 121b on the computer device. A local printer and/or a network printer which are connected to the primary user account 121 are discovered and automatically provisioned in the secondary user account 121b. Access to the or each printer 500 is controlled by an agent 300 on the computer device 200.

20 Claims, 10 Drawing Sheets

COMPUTER DEVICE AND METHOD FOR ISOLATING UNTRUSTED CONTENT

CROSS REFERENCE TO RELATED APPLICATIONS

This application claims priority under 35 U.S.C. §119 to United Kingdom Application No. 1318723.2, filed Oct. 23, 2013, United Kingdom Application No. 1320212.2, filed Nov. 15, 2013, and United Kingdom Application No. 1418632.4, filed Oct. 20, 2014. Each of the foregoing applications is hereby incorporated by reference herein in its entirety.

BACKGROUND

1. Technical Field

The present disclosure relates generally to the field of computers and computer devices. More particularly, the present disclosure relates to a computer device and a method for isolating untrusted content.

2. Description of Related Art

There is an on-going need to protect computer devices from malicious content, as is well recognised in the field of computer security. In particular, it is desired to protect computer devices from malicious content which may be introduced by actions of the user, such as downloading a file or executing an application. In the related art, it is known to isolate untrusted content by limiting the resources of the computer device which are accessible by the untrusted content. As one example, it is known to perform content isolation by using virtual machines, which emulate a physical host computer.

A difficulty arises in that many of the current mechanisms for content isolation are relatively insecure, in that they still allow malicious content to reach important resources of the computer device. Also, many known implementations of content isolation are relatively resource intensive, such as by needing a relatively large amount of memory, disc space or computer processing power.

As a further difficulty, content isolation often requires a relatively skilled and knowledgeable user of the computer device. Therefore, it is quite difficult for an ordinary user to implement content isolation in a way which is safe, effective and reliable, yet also simple and intuitive. In some cases, content may need to be adapted in advance for the purposes of isolation, by being specifically prepared in a manner capable of being isolated, which increases costs and makes content isolation less likely to be implemented in practice.

The example embodiments have been provided with a view to addressing at least some of the difficulties that are encountered in current computer devices and computer networks, whether those difficulties have been specifically mentioned above or will otherwise be appreciated from the discussion herein.

SUMMARY

The present disclosure provides a computer system, a method and a computer-readable storage medium as set forth in the appended claims. Other, optional, features of various embodiments will be apparent from the dependent claims, and the description which follows.

There now follows a summary of various aspects and advantages according to various embodiments. This summary is provided as an introduction to assist those skilled in the art to more rapidly assimilate the detailed discussion herein and is not intended in any way to limit the scope of the claims that are appended hereto.

A computer system and method are described which are provided to intercept a task from a primary user account prior to execution of the task by the computer device, where the task relates to an untrusted content. A task isolation environment is provisioned for executing the task, including programmatically creating a secondary user account on the computer device. A local printer and/or a network printer which are connected to the primary user account are discovered and automatically provisioned in the secondary user account. Access to the or each printer is controlled by an agent on the computer device.

In one example there is described a computer device, comprising: a hardware layer including at least a processor and a memory; an operating system which performs tasks using the hardware layer; a user process operating in a primary user account controlled by the operating system and configured to request a task to be actioned by the operating system, wherein the primary user account comprises a network drive which is mapped into the primary user account; an agent configured to execute in cooperation with the operating system; wherein the agent comprises: a task interceptor unit arranged to intercept the task before being actioned by the operating system and provide task metadata relevant to the intercepted task; a task policy unit arranged to examine the task metadata and selectively output a policy result identifying the task as being an untrusted task; an isolation environment provisioner unit configured to provision a task isolation environment by (i) programmatically creating a secondary user account on the computer device, (ii) determining a printer which is available in the primary user account, and (iii) making the printer available in the secondary user account by populating printer-related user settings in the secondary user account; and a controller configured to cause the untrusted task to be executed as an isolated process in the task isolation environment provided by the secondary user account.

In some embodiments, the agent is further configured to: intercept a printer service request by the task in the secondary user account in relation to the printer; determine whether to allow or deny the printer service request by the task of the secondary user account in relation to the printer; and provide impersonated credentials of the primary user account when the printer service request is allowed and allow the printer service request to proceed using the impersonated credentials. In some embodiments, the agent is further configured to: copy one or more user preference settings from a registry of the primary user account concerning the printer; and populate a registry of the secondary user account with the user preference settings copied from the primary user account. In some embodiments, the agent is further configured to: cause one or more printer related user preference settings held by an operating system of the computer device other than in the registry of the primary user account to be populated in the operating system in relation to the secondary user account. In some embodiments, the task operating in the task isolation environment is arranged to perform a printer related function by obtain and display a list of connected printers available to the secondary user account, wherein the list of printers is a subset of a list of printers available in the primary user account. In some embodiments, the task executing in the task isolation environment is configured to command a new print job; and the agent is configured to support completion of the new print job by an operating system of the computer device using the impersonated credentials. In some embodiments, the agent is further configured to: hook a printer service request made by a process executing in the task isolation environment; obtain parameters from the printer service request; and present the printer service request to a printer service in a operating system of the computer device using the parameters obtained from the intercepted printer service request and the impersonated credentials. In some embodiments, the printer service request is directed toward a print spooler in the operating system of the computer device. In some embodiments, the printer is a network printer available to the computing device via a print server, and the impersonated credentials are presented to the print server. In some embodiments, the printer is a local printer coupled to the computing device.

In one example there is described a method for isolating untrusted content on a computer device, the method comprising: intercepting a task from a primary user account prior to execution of the task by the computer device, wherein the task relates to an untrusted content; provisioning a task isolation environment for executing the task, including (i) programmatically creating a secondary user account on the computer device, (ii) determining a printer which is available in the primary user account, and (iii) making the printer available in the secondary user account by populating printer-related user settings in the secondary user account; executing the task in the task isolation environment in relation to the untrusted content; intercepting by an agent a printer service request by the task in the secondary user account in relation to the printer; determining by the agent whether to allow or deny the printer service request by the task of the secondary user account in relation to the printer; and providing impersonated credentials of the primary user account by the agent when the printer service request is allowed and allowing the printer service request to proceed using the impersonated credentials.

In some embodiments, the method further comprises performing by the agent the steps of: copying one or more user preference settings from a registry of the primary user account concerning the printer; and populating a registry of the secondary user account with the user preference settings copied from the primary user account. In some embodiments, the method further comprises performing by the agent the steps of: causing one or more printer related user preference settings held by an operating system of the computer device other than in the registry of the primary user account to be populated in the operating system in relation to the secondary user account. In some embodiments, the method further comprises: performing a printer related function by the task operating in the task isolation environment to obtain and display a list of connected printers available to the secondary user account, wherein the list of printers is a subset of a list of printers available in the primary user account. In some embodiments, the method further comprises: commanding a new print job by the task executing in the task isolation environment; and supporting by the agent completion of the new print job by an operating system of the computer device using the impersonated credentials. In some embodiments, the method further comprises performing by the agent the steps of: hooking a printer service request made by a process executing in the task isolation environment; obtaining parameters from the printer service request; and presenting the printer service request to a printer service in a operating system of the computer device using the parameters obtained from the intercepted printer service request and the impersonated credentials. In some embodiments, the printer service request is directed toward a print spooler in the operating system of the computer device. In some embodiments, the printer is a network printer available to the computing device via a print server, and the impersonated credentials are presented to the print server. In some embodiments, the printer is a local printer coupled to the computing device.

In one example, a computer readable storage medium is provided having recorded thereon instructions which, when implemented by a computer device, perform the steps of: intercepting a task from a primary user account prior to execution of the task by the computer device, wherein the task relates to an untrusted content; provisioning a task isolation environment for executing the task, including (i) programmatically creating a secondary user account on the computer device, (ii) determining a printer which is available in the primary user account, and (iii) making the printer available in the secondary user account by populating printer-related user settings in the secondary user account; executing the task in the task isolation environment in relation to the untrusted content; intercepting, by an agent, a printer service request by the task in the secondary user account in relation to the printer; determining, by the agent, whether to allow or deny the printer service request by the task of the secondary user account in relation to the printer; and providing impersonated credentials of the primary user account by the agent when the printer service request is allowed and allowing the printer service request to proceed using the impersonated credentials.

In one example, a tangible non-transient computer-readable storage medium is provided having recorded thereon instructions which, when implemented by a computer device, cause the computer device to be arranged as set forth herein and/or which cause the computer device to perform any of the methods as set forth herein.

A computer system and method are described which are arranged to intercept a task from a primary user account prior to execution of the task by the computer device, where the task relates to an untrusted content. A task isolation environment is provisioned for executing the task, including programmatically creating a secondary user account on the computer device. The task is executed in the task isolation environment in relation to the untrusted content. A second folder in the secondary user account is mapped to a first folder in the primary user account and file access requests for the second folder are intercepted by an agent and are redirected to the first folder.

In one example there is described a computer device, comprising: a hardware layer including at least a processor and a memory; an operating system which performs tasks using the hardware layer; a user process operating in a primary user account controlled by the operating system and configured to request a task to be actioned by the operating system, wherein the primary user account comprises a first folder for containing files which are accessible under the primary user account; an agent configured to execute in cooperation with the operating system, and wherein the agent comprises: a task interceptor unit arranged to intercept the task before being actioned by the operating system and provide task metadata relevant to the intercepted task; a task policy unit arranged to examine the task metadata and selectively output a policy result identifying the task as being an untrusted task; an isolation environment provisioner unit configured to provision a task isolation environment by programmatically creating a secondary user account on the computer device, wherein the secondary user account comprises a second folder for containing files which are accessible under the secondary user account; and a controller configured to cause the untrusted task to be executed as an isolated process in the task isolation environment provided by the secondary user account; wherein the agent is further configured to map the second folder of the secondary user account to the first folder of the primary user account, and to redirect a file access request by the isolated process to a subject file in the second folder to be performed by the operating system in relation to a target file in the first folder of the primary user account.

In some embodiments, the agent is further configured to: intercept a file access request by the user process to the target file in the first folder of the primary user account, and selectively deny the file access request to prevent the file access request being performed by the operating system where the target file has previously been accessed by the isolated process of the secondary user account. In some embodiments, the agent is further configured to: hook a file access request by the isolated process executing in the task isolation environment of the secondary user account, wherein the file access request concerns a local file held locally within the secondary user account; and allow the file access request to be performed by the operating system on the local file in the secondary user account. In some embodiments, the agent is further configured to: hook a file access request by the isolated process executing in the task isolation environment of the secondary user account, wherein the file access request concerns the target file; and create an impersonation token of the primary user account to access the target file when the file access request is redirected to be performed by the operating system on the target file in the first folder within the primary user account. In some embodiments, the agent is configured to: deny the file access request made by the isolated process in the secondary user account concerning the target file where the file access request would cause an existing file to be overwritten in the first folder of the primary user account. In some embodiments, the agent is further configured to: tag the target file in the primary user account when the file is accessed in response to the file access request of the isolated process in the secondary user account, and intercept a subsequent file access request by the user process in the primary user account which subsequently attempts to access the target file having the tag. In some embodiments, the agent is further configured to: cause the subsequent file access request to be satisfied by accessing the target file by the isolated process of the secondary user account. In some embodiments, the first folder in the primary user account comprises a plurality of files including at least one trusted file and at least one untrusted file and the agent is configured to selectively allow the at least one trusted file to be accessed only by the user process of the primary user account and to allow the at least one untrusted file to be accessed only by the isolated process of the secondary user account. In some embodiments, the agent is further configured to determine a permitted level of access of the isolated process to the target file and to selectively allow or deny the file access request compared with the determined permitted level of access. In some embodiments, the primary user account is associated with a named object, and the agent is arranged to intercept an object create operation or an object open operation in relation to the named object by a process in the task isolation environment, check a policy result in relation to the named object and, if access is granted, to provide to the process an impersonation token having access to the named object, thereby allowing the process to access the named object using the impersonation token. In some embodiments, a process in the task isolation environment is arranged to make a request for creation of a named object within the task isolation environment; and the agent is arranged to intercept the request, provide a modified name of the object by modifying an original name of the object, and cause the process to create the named object using the modified name.

In one example there is described a method for isolating untrusted content on a computer device, the method comprising: intercepting a task from a primary user account prior to execution of the task by the computer device, wherein the task relates to an untrusted content; providing a task isolation environment for executing the task, including provisioning the task isolation environment by programmatically creating a secondary user account on the computer device; executing the task in the task isolation environment in relation to the untrusted content; and redirecting a folder from the task isolation environment to a folder of the primary user account.

In some embodiments, the method further comprises: hooking a file access request to create or open a file by a process executing in the task isolation environment; where the file access request concerns a file locally within the isolation environment, then allowing the file to be created or opened by the operating system in the secondary user account; and where the file access request concerns a target file in the folder redirected within the primary user account, then creating an impersonation token of the primary user account to access the target file. In some embodiments, the method further comprises: tagging the target file with a tag; and intercepting a task in the primary user account which subsequently attempts to access the target file having the tag. In some embodiments, the method further comprises causing a subsequent file access request to the target file in the folder of the primary user account originated by a user process operating in the primary user account to be satisfied by accessing the target file by the task in the task isolation environment of the secondary user account. In some embodiments, the folder in the primary user account comprises a plurality of files including at least one trusted file and at least one untrusted file and the method further comprises: selectively allowing the at least one trusted file to be accessed only by a user process of the primary user account, and selectively allowing the at least one untrusted file to be accessed only by the task in the task isolation environment of the secondary user account. In some embodiments, the method further comprises: intercepting a file access request by the task in the task isolation environment to a local file in a local folder of the secondary user account, and selectively allowing the file access request to proceed to be performed by the operating system on the local file in the local folder of the secondary user account. In some embodiments, the method further comprises: intercepting a file access request by the user process to a requested file in a folder of the primary user account, and selectively allowing the file access request to proceed to be performed by the operating system on the requested file in the folder of the primary user account. In some embodiments, the method further comprises: providing a named object associated with the primary user account; intercepting an object create operation or an object open operation in relation to the named object by a process in the task isolation environment; checking a policy result in relation to the named object; and providing to the process, if access is granted, an impersonation token having access to the named object, thereby allowing the process to access the named object using the impersonation token. In some embodiments, the method further comprises: making a request for creation of a named object within the task isolation environment by a process therein; intercepting the request; passing a modified name of the object to the process by modifying a name of the object; and creating the named object using the modified name.

A computer system and method are described which are provided to intercept a task from a primary user account prior to execution of the task by the computer device, where the task relates to an untrusted content. A task isolation environment is provisioned for executing the task, including programmatically creating a secondary user account on the computer device. A mapped network drive of the primary user account is determined and is automatically provisioned in the secondary user account. Access to the mapped network drive is controlled by an agent on the computer device.

In one example there is described a computer device, comprising: a hardware layer including at least a processor and a memory; an operating system which performs tasks using the hardware layer; a user process operating in a primary user account controlled by the operating system and configured to request a task to be actioned by the operating system, wherein the primary user account comprises a network drive which is mapped into the primary user account; an agent configured to execute in cooperation with the operating system; wherein the agent comprises: a task interceptor unit arranged to intercept the task before being actioned by the operating system and provide task metadata relevant to the intercepted task; a task policy unit arranged to examine the task metadata and selectively output a policy result identifying the task as being an untrusted task; an isolation environment provisioner unit configured to provision a task isolation environment by (i) programmatically creating a secondary user account on the computer device, (ii) determining a network drive which is mapped in the primary user account, and (iii) recreating the network drive in the secondary user account by mapping the network drive into the secondary user account; and a controller configured to cause the untrusted task to be executed as an isolated process in the task isolation environment provided by the secondary user account.

In some embodiments, the agent is further configured to: intercept a file access request by the task in relation to the mapped network drive of the secondary user account; and determine whether to allow or deny the file access request by the task in relation to the mapped network drive of the secondary user account. In some embodiments, the agent is further configured to: intercept a file access request by the user process to a target file in the mapped network drive, and selectively deny the file access request to prevent the file access request being performed by the operating system where the target file has previously been accessed by the isolated process of the secondary user account. In some embodiments, the agent is further configured to: hook a file access request by the isolated process executing in the task isolation environment of the secondary user account, wherein the file access request concerns a target file in the mapped network drive; and create an impersonation token of the primary user account to access the target file when the file access request is performed by the operating system on the target file in the mapped network drive. In some embodiments, the agent is further configured to: deny the file access request made by the isolated process in the secondary user account concerning the target file where the file access request would cause an existing file to be overwritten in the mapped network drive. In some embodiments, the agent is further configured to: tag the target file in the mapped network drive when the file is accessed in response to the file access request of the isolated process in the secondary user account, and intercept a subsequent file access request by the user process in the primary user account which subsequently attempts to access the tagged target file in the mapped network drive. In some embodiments, the agent is further configured to: cause the subsequent file access request to be satisfied by accessing the tagged target file in the mapped network drive by the isolated process of the secondary user account. In some embodiments, the mapped network drive comprises a plurality of files including at least one trusted file and at least one untrusted file and the agent is configured to selectively allow the at least one trusted file to be accessed only by the user process of the primary user account and to allow the at least one untrusted file to be accessed only by the isolated process of the secondary user account. In some embodiments, the agent is further configured to determine a permitted level of access of the isolated process to a target file in the mapped network drive and to selectively allow or deny the file access request compared with the determined permitted level of access. In some embodiments, the primary user account is associated with a named object, and the agent is further configured to intercept an object create operation or an object open operation in relation to the named object by a process in the task isolation environment, check a policy result in relation to the named object and, if access is granted, to provide to the process an impersonation token having access to the named object, thereby allowing the process to access the named object using the impersonation token. In some embodiments, a process in the task isolation environment is arranged to make a request for creation of a named object within the task isolation environment; and the agent is arranged to intercept the request, provide a modified name of the object by modifying an original name of the object, and cause the process to create the named object using the modified name.

In one example there is described a method for isolating untrusted content on a computer device, the method comprising: intercepting a task from a primary user account prior to execution of the task by the computer device, wherein the task relates to an untrusted content; provisioning a task isolation environment for executing the task, including (i) programmatically creating a secondary user account on the computer device, (ii) determining a network drive which is mapped in the primary user account, and (iii) recreating the network drive in the secondary user account by mapping the network drive into the secondary user account; executing the task in the task isolation environment in relation to the untrusted content; intercepting by an agent a file access request by the task in relation to the mapped network drive of the secondary user account; and determining by the agent whether to allow or deny the file access request by the task in relation to the mapped network drive of the secondary user account.

In some embodiments, the method further comprises: hooking a file access request to create or open a file by a process executing in the task isolation environment; where the file access request concerns a file locally within the task isolation environment, then allowing the file to be created or opened in the secondary user account by an operating system of the computer device; and where the file access request concerns a target file in the mapped network drive, then creating an impersonation token of the primary user account to access the target file. In some embodiments, the method further comprises tagging the target file, and intercepting a task in the primary user account which subsequently attempts to access the tagged target file. In some embodiments, the method further comprises: causing a subsequent file access request to the tagged target file in the mapped network drive originated by a user process operating in the primary user account to be satisfied by accessing the target file by the task in the task isolation environment of the secondary user account. In some embodiments, the mapped network drive comprises a plurality of files including at least one trusted file and at least one untrusted file and the method further comprises: selectively allowing the at least one trusted file to be accessed only by a user process of the primary user account, and selectively allowing the at least one untrusted file to be accessed only by the task in the task isolation environment of the secondary user account. In some embodiments, the method further comprises: intercepting by the agent a file access request by the task in the task isolation environment to a local file in a local folder of the secondary user account, and selectively allowing by the agent the file access request to proceed to be performed by the operating system on the local file in the local folder of the secondary user account. In some embodiments, the method further comprises: intercepting by the agent a file access request by the user process to a requested file in a folder of the primary user account, and selectively allowing by the agent the file access request to proceed to be performed by the operating system on the requested file in the folder of the primary user account. In some embodiments, the method further comprises: providing a named object associated with the primary user account; intercepting by the agent an object create operation or an object open operation in relation to the named object by a process in the task isolation environment; checking by the agent a policy result in relation to the named object; and providing by the agent to the process, if access is granted, an impersonation token having access to the named object, thereby allowing the process to access the named object using the impersonation token. In some embodiments, the method further comprises: making a request for creation of a named object within the task isolation environment by a process therein; intercepting the request by the agent; passing by the agent a modified name of the object to the process by modifying a name of the object; and creating the named object using the modified name.

BRIEF DESCRIPTION OF THE DRAWINGS

For a better understanding of the disclosure, and to show how example embodiments may be carried into effect, reference will now be made to the accompanying drawings in which.

DETAILED DESCRIPTION OF THE EXAMPLE EMBODIMENTS

At least some of the following example embodiments provide an improved mechanism for isolating untrusted content in a computer device. Advantageously, the example embodiments leverage inherent security of an existing operating system to provide a new mechanism for content isolation. In one example, content isolation can be implemented multiple times simultaneously on the same computer device, i.e. multiple items of untrusted content may each be given their own isolation environment simultaneously. The example mechanism is simple and convenient for the user, and is lightweight to implement. Further, the example embodiments are more secure than many other practical implementations. Many other advantages and improvements will be discussed in more detail herein.

Many operating systems apply a security model wherein access privileges are based on a user account. The operating system may define privilege levels appropriate to different classes, or groups, of users, and then apply the privileges of the relevant class or group to the particular logged-in user (e.g. ordinary user, super-user, local administrator, system administrator and so on). The user is authenticated by logging in to the computer device, and the user, via their previously prepared security account, acts as a security principal in the security model. The operating system of the computer device then grants appropriate privileges to processes which execute in that user's security context.

In practice, there is a widespread tendency to grant additional privilege rights, such as a local administrator level, or a system administrator level, to all members of the relevant user group, and thus allow access to almost all of the resources of the computer device. This level of access may be greater than is desirable or appropriate from a security viewpoint. For example, there is the possibility of accidental tampering with the computer device, leading to errors or corruption within the device. Further, a particular process (e.g. an infection or malware) may maliciously access key resources of the computer device with the deliberate intention of subverting security or causing damage.

Figure 1:
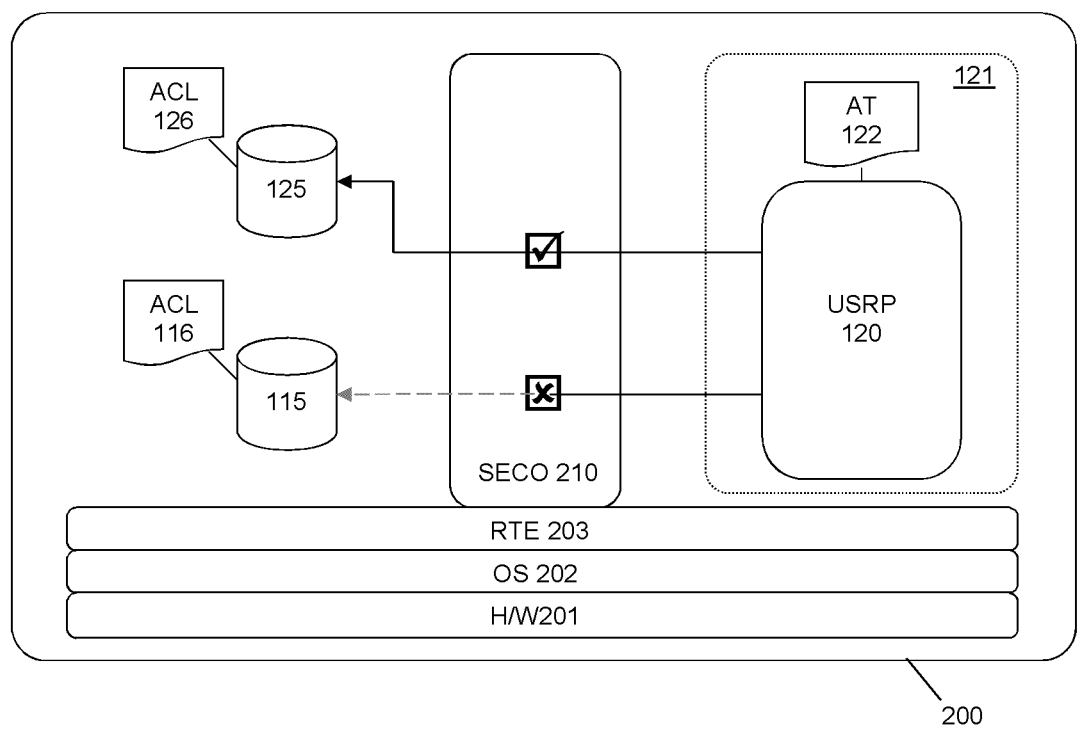
FIG. 1 is a schematic view of an example computer device.

FIG. 1 is a schematic overview of the computer device 200. The computer device 200 is configured to authenticate a user by an appropriate login procedure. For example, the user may log in to the computer device 200 with a user identity and password, and their user credentials may be validated locally or via a remote service such as a domain controller (e.g. an Active Directory domain controller).

Generally, the computer device 200 comprises physical hardware (HW) 201 such as memory, processors (CPUs), I/O interfaces, backbone, power supply and so on. An operating system (OS) 202 provides a multitude of components, modules and units that coordinate to provide a runtime environment (RTE) 203 which supports execution of a plurality of processes (USRP) 120. The computer device 200 further comprises a plurality of resources 115, 125. These resources 115, 125 are the components of the computer device that the processes 120 may rely upon in order to carry out their execution. For example, the resources 115, 125 may comprise installed software, system services, drivers, files and/or registry settings.

The example embodiments of the present disclosure will be discussed in detail in relation to computers and computer devices using the Windows™ family of operating systems provided by Microsoft™. However, the teachings, principles and techniques of the present disclosure are also applicable in other example embodiments. For example, the example embodiments are also applicable to other operating systems, such as UNIX, Linux, and iOS, and in particular those having a discretionary access control security model.

As shown in FIG. 1, the operating system 202 may comprise a security module (SECO) 210 which is provided to enforce security within the computer device 200. As one example, the security module 210 is provided by the Windows™ operating system as supplied by Microsoft Corp of Redmond, Wash., USA, under the trade marks Windows NT, Windows 2000, Windows XP, Windows Vista, Windows Server 2003, Windows Server 2008, and Windows 7, amongst others. The security module 210, also termed a security subsystem or security manager, suitably enacts the Windows security model as described, for example, in "*Windows Security Overview*" published 10 Jun. 2011 by Microsoft Corporation.

Each process 120 initiated by a user will be run in a security context 121 that derives access rights and permissions from the user's security account. To this end, each process 120 is provided with an access token (AT) 122. The access token 122 typically carries the security identity (SID) of the user and SIDs of any other security groups to which the user belongs. The access token 122 thus defines the privileges as held on this computer 200 by the user and their relevant security groups.

In the example embodiment, the security module 210 is arranged to perform an access check when a process 120 requests access to any of the resource 115, 125. The security module 210 performs the access check by comparing the access token 122 of the process 120 against a security descriptor, such as an access control list (ACL) 116, 126, associated with the relevant resource 115, 125. Here, the access control list 116, 126 is suitably a Discretionary Access Control List (DACL) which identifies SIDs of users and groups that are allowed, or denied, various types of access (read, write, etc.) as appropriate for that resource.

In FIG. 1, the security module (SECO) 210 in the operating system 202 is arranged to control access by the process 120 to the resources 115, 125, according to the respective access control list 116, 126. For example, a particular process 120 is able to read from, but not write to, a file of the first resource 115. Typically, the defined access types will depend upon the type of resource being accessed. For example, storage is typically defined by read and write access rights, while a process may have terminate access rights which determine whether or not a request to terminate that process will be actioned by the operating system 202. As noted above, a user-level security context 121 is based on the user as the security principal and the access token 122 is set accordingly. Suitably, in a system which adopts the least-privilege access model, the user-level security context 121 is deliberately restricted to a minimal set of access rights as a default, original privilege level.

Figure 2:
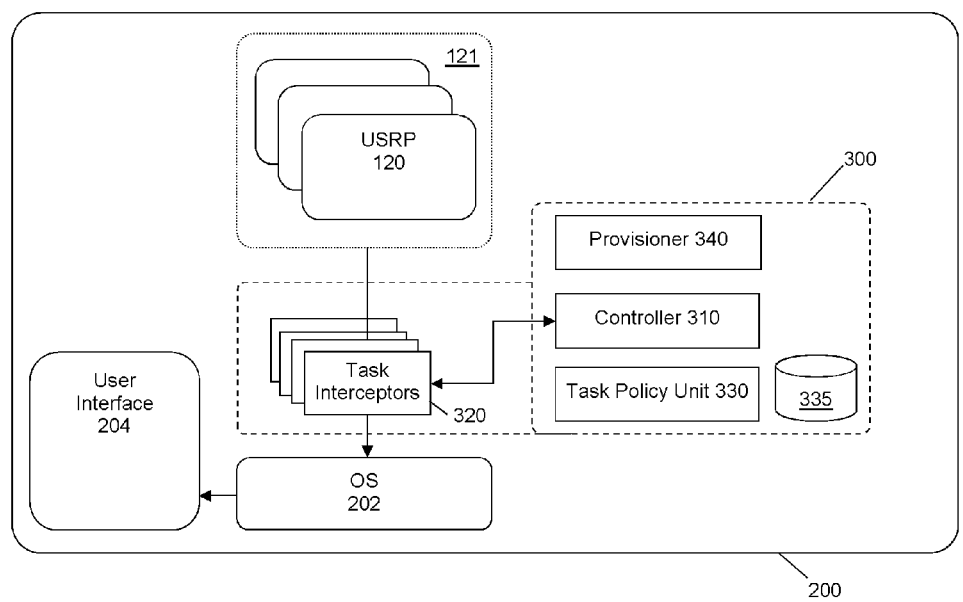
FIG. 2 is a more detailed schematic view of the example computer device.

FIG. 2 is a further schematic view of the computer device, including an example mechanism for isolating untrusted content. In one example, the mechanism applies task isolation functions in the computer device.

FIG. 2 shows one or more user processes 120 that are currently executing in a corresponding user security context 121. The operating system 202 provides a user interface component 204 which provides physical interactions with the user, including providing outputs to the user (e.g. by providing a graphical user interface on the display screen) and receiving inputs from the user (e.g. via keyboard, mouse or other input devices). The user inputs received through the user interface 204 cause the user processes 120 to perform tasks. Typically, each task requires the user processes 120 to interact with relevant components of the operating system 202, most often via the operating system security module 210 described before. In a windowed operating system (such as Microsoft Windows™), the user interface 204 may interact with the user via one or more window station objects. In the operating system, the window station object is responsible for displaying the user interface and receiving the user inputs. This window station object contains, amongst other things, one or more desktop objects, as will be familiar to the skilled person, which control the user's desktop as a graphical user interface.

These user interactions may cause the computer device 200 to perform tasks, at least some of which may be defined in advance as being 'untrusted' tasks. For example, untrusted tasks may comprise certain forms of Web browsing, viewing email attachments, starting an untrusted application program, or accessing a particular file in a storage medium. Generally, the untrusted tasks may involve non-executable content (data) and/or may comprise executable content (code) which, at least initially, is not trusted. In the example embodiments, there is a need to isolate these untrusted tasks, so that these tasks are inhibited from interfering with other tasks or components of the computer device. Isolation is advantageous to inhibit interference, whether caused intentionally or unintentionally. Notably, 'untrusted' does not mean that the respective task is necessarily malicious. Instead, the untrusted task simply has the possibility of introducing undesired effects and, at least initially, it is desired to isolate the untrusted task away from most of the other resources or components of the computer device.

Often, as a practical example, there may be a need to open untrusted content within an already trusted application. For instance, an untrusted PDF document can be opened and viewed in a trusted document reader application (e.g. Adobe Acrobat Reader). A trusted Web browser (e.g. Internet Explorer) may be instructed by the user to view an untrusted website. Hence, there is an advantage in being able to isolate the trusted applications, at least temporarily, while untrusted content is being manipulated.

As shown in FIG. 2, a content isolation agent 300 is provided to protect the computer device 200 from malicious attacks by untrusted content. The example content isolation agent 300 is shown installed on the computer device 200, and suitably operates in close association with the native operating system 202. In this example, the content isolation agent 300 comprises a controller unit 310, one or more task interceptor units 320, a task policy unit 330 and a provisioner unit 340.

The task interceptor units 320 are each arranged to intercept one or more respective tasks, when those tasks are instructed by the user processes 120. In one example, each task interceptor unit 320 is arranged to intercept certain tasks prior to implementation of those tasks by the operating system 202. Further, the interceptor units 320 may obtain task metadata concerning the intercepted task, and communicate that task metadata to the controller 310.

The policy unit 330 is configured to store policies relating to the intercepted tasks, suitably in a policy database 335 (e.g. recorded on a non-transient storage medium). The policy unit 330 interrogates the policy database 335 based on the provided task metadata and returns a policy result to the controller 310.

The controller 310 is configured to intervene selectively in relation to an intercepted task. The controller 310 may, for example, decide to block (deny) the requested task, allow the requested task to continue natively to reach an intended target in the operating system, or to isolate an untrusted task using an isolation environment.

In practice, many of the tasks which are instructed by the user processes 120 may proceed normally with minimal intervention, because these tasks do not relate to untrusted content. That is, the task interceptor units 320 will not intercept a task which, e.g. by its type or nature, is not of interest to the agent 300, and may allow those tasks to proceed directly to the operating system. However, where a task is identified as potentially relating to untrusted content, then the task is intercepted and the controller 310 now has the opportunity to review the task using the policy unit 330 and to selectively intervene based on the obtained policy result. Suitably, the policies set with respect to the respective devices are capable of being adapted with any desired level of granularity. The policies within the policy unit 330 may be tailored appropriate to individual devices or individual users, if desired.

Figure 3:
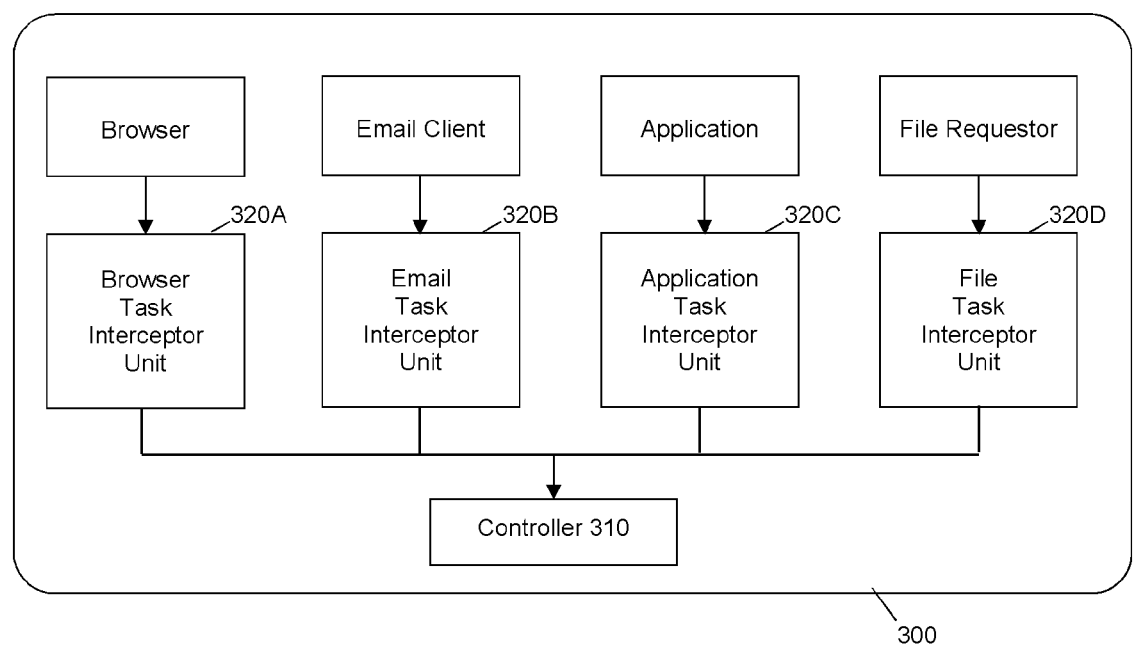
FIG. 3 is a further schematic view of the example computer device.

FIG. 3 is a schematic view of the task interceptor units 320 in more detail.

In one example embodiment, the task interceptors 320 may comprise at least a browser task interceptor unit 320A, an email task interceptor unit 320B, an application task interceptor unit 320C, and a data file task interceptor unit 320D, amongst others.

The browser task interceptor unit 320A may comprise registering a plugin with a browser application. In one example, the plugin may be a browser helper object (BHO) plugin. This plugin notifies the respective task interceptor unit 320 of each web page that is requested by the user using the browser, prior to the web page being fetched by the browser application. The interceptor unit thus obtains task metadata about the respective task, in this case metadata about the requested web page about to be fetched, and passes this task metadata to the controller 310.

The email task interceptor unit 320B may be implemented as an add-on or plugin to an email client application, such as Outlook. In particular, the add-on or plugin may receive 'save to disc' notifications whenever the email client attempts to access data files on the disc. The task interceptor unit 320 may receive task metadata, which in this example concerns the data file to be accessed, the email which requested the access, and so on. The interceptor unit thus obtains task metadata about the respective task, in this case being metadata about the requested file access, and passes this task metadata to the controller 310.

The application task interceptor unit 320C may hook certain process and thread generation functions within the operating system, such as a 'CreateProcessInternal' function which creates a new process and its primary thread. This process creation function is called when starting a new application program. The interceptor unit thus obtains appropriate task metadata, in this case information about the intended application to be opened, and passes this metadata to the controller 310.

The file interceptor unit 320D may intercept tasks relevant to opening a stored file (i.e. tasks performed by the computer device in response to double-clicking a file in a file explorer process). The interceptor unit thus obtains the task metadata, in this case information about the intended data file to be opened, and passes this metadata to the controller 310.

Notably, a particular first example of the computer device 200 may have one particular first set of task interceptor units 320. Meanwhile, a second example computer device 200 may have a differing set of the task interceptors 320. Thus, the nature and type of the task interceptors 320 installed on the computer device may vary.

Figure 4:
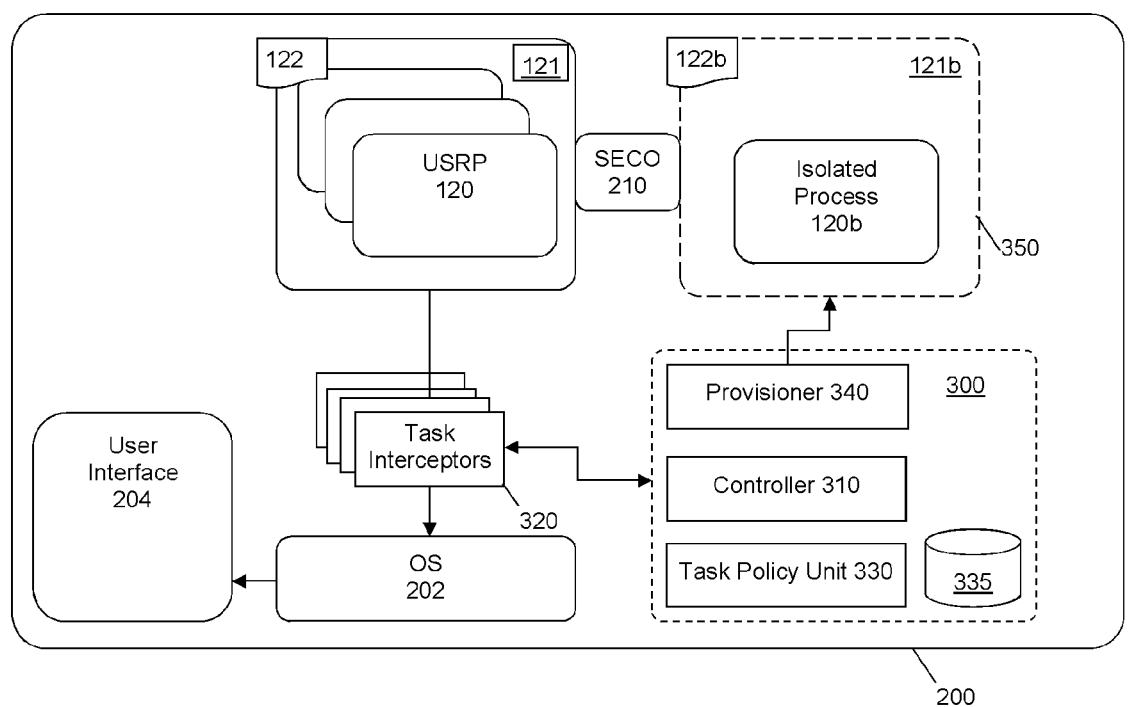
FIG. 4 is a further schematic view of the example computer device while in operation.

FIG. 4 is a schematic view of the computer device 200 with the content isolation agent 300 in operation.

Where the controller 310 determines that the task in question relates to untrusted content, i.e. is determined to be an untrusted task, then the controller 310 causes the untrusted task to be opened in a task isolation environment 350. The controller 310 may cause a task isolation environment 350 to be provisioned. The isolation environment 350 may be configured based on configuration settings provided by the policy unit 330. Suitably, the policy unit 330 stores policies relevant to each identifiable task which is capable of being intercepted by the task interceptor units 320. Thus, the system is capable of implementing different types of task isolation environments, each having different configurations, based on the policy settings.

Where a new task isolation environment is required, then such a task isolation environment 350 is provisioned by the controller 310, suitably by instructing the provisioner unit 340. The provisioner unit 340 provisions the new task isolation environment 350 by programmatically creating user credentials for a new user account 121b on the computer device 200, and presenting those created user credentials to the operating system 202. Suitably, the new user account 121b is a temporary user account with a programmatically created password set by the provisioner 340. For example, the provisioner 340 may generate the password as a random or pseudo-random character string. The content isolation agent 300 automatically provides these user credentials to generate the temporary user account 121b. Thus, the computer device 200 now contains the original user account 121 of the original logged in user, as a first user account. The device also now contains a second user account 121b, namely the temporary user account, which has been programmatically created by the provisioner 340. The temporary user account 121b has a corresponding access token 122b, created by logging on with the credentials with the temporary user account 121b as just created. The temporary user account 121b thus forms the task isolation environment 350 in which tasks may be executed safely and in isolation from protected resources of the computer system 200, as will be discussed in more detail below.

In one example, the access token 122b of the temporary user account 121b is granted rights to the desktop user interface 204 of the logged in user account 121, enabling untrusted tasks running under the temporary user account 121b to be displayed on the same desktop of the current user 121. The isolated tasks 120b in the task isolation environment 350 may be displayed simultaneously with trusted tasks 120 which are already being executed, or which are to be executed later, by this logged on user account 121.

In one example, the controller 310 launches the intercepted task now inside the task isolation environment 350 provided by the temporary user account 121b. Thus, the untrusted task launches processes 120b which are associated with the access token 122b of the temporary user account 121b. Notably, the security module 210 of the operating system 202, which is conveniently native to the computer system 200, now is leveraged to isolate this untrusted task away from content of the main user account 121.

By default, the isolation environment 121b provided by the temporary user account 121b will not enjoy access to the profile and data of the logged in user account 121, and vice versa. Further, the temporary user account 121b is suitably given minimal standard privileges, i.e. without administrative access, and is isolated from resources of the operating system 202.

The untrusted task now runs in this temporary user account 121b and accesses the profile of the temporary user for both data access and registry access. Any malicious activity only affects the temporary user account 121b and does not affect the primary user account 121.

In one example embodiment, the temporary user account 121b is non-persistent. The temporary user account 121b may be completely deleted after use. That is, the controller 310 may determine that the temporary user account 121b is no longer needed, and may delete the temporary user account 121b from the computer device 200, thus removing all traces of the untrusted task and untrusted content. When the user wishes to repeat the untrusted task again, associated with the untrusted content, again a new task isolation environment is provisioned as discussed herein and the task is run within that new task isolation environment.

In another example embodiment, task isolation environments 350 may be persistent between sessions. That is, the controller 310 may choose to maintain a particular isolation environment 350 over one or more sessions, thus providing continuity for the user for the relevant task. In one example, a session is started by the real user logging in to the computer device, and concluded by the user logging out.

Figure 5:
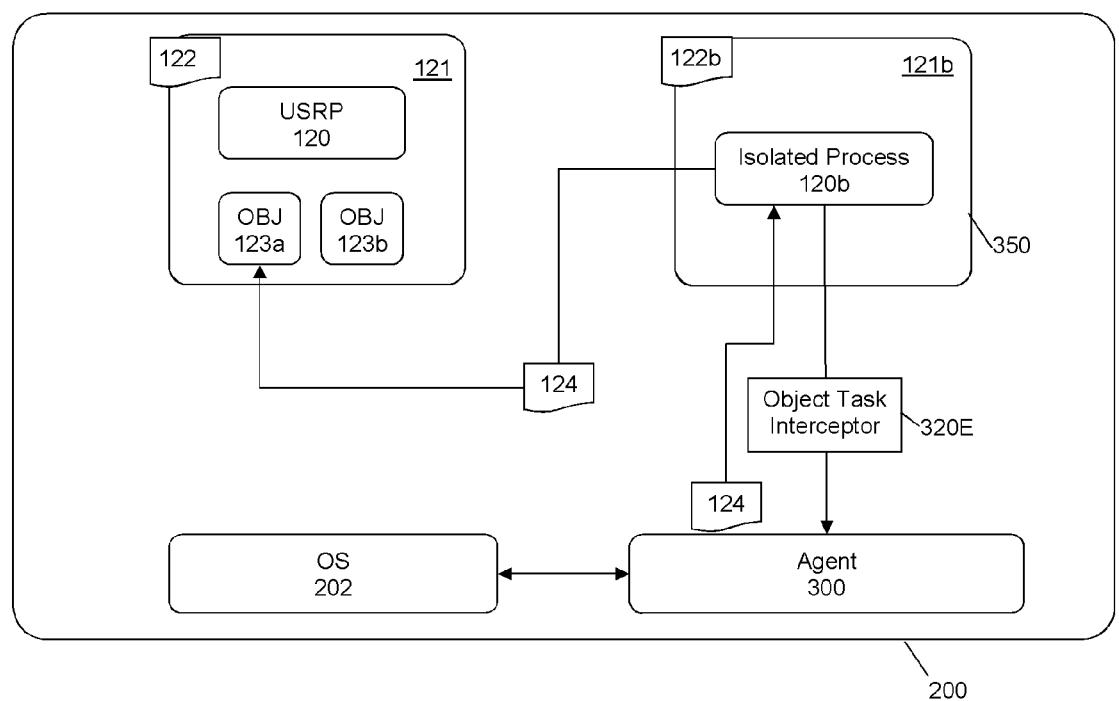
FIG. 5 is a further schematic view of the example computer device while in operation.

FIG. 5 is a further schematic view of the computer device. As shown in FIG. 5, the primary user account 121 may be associated with one or more named objects 123*a*, 123*b*. In this example, a difficulty arises in that an application executing in the isolation environment 350 is unable to access the named objects 123*a*, 123*b* which are associated instead with the primary user account 121.

In many operating systems, such as Windows™, named objects are used for inter-process communication and synchronization. Typical objects comprise events, semaphores, mutexes, waitable timers and file-mapping (sections). Each process in a particular user session (i.e. with the same Terminal Service session id) creates or opens named objects in a namespace of the user session. This user session namespace is secured with the user's logon SID. As described above, a process 120*b* running in an isolation environment 350 shares the session id of the primary user account 121, but will have a different logon SID, and therefore by default does not have access to the namespace of the primary user account 121.

To provide access for the isolated processes 120*b* to the user session namespace, each operation to open or create a named object (i.e. an object create or an object open operation) is intercepted, by an appropriate task interceptor 320E, and an access request message is sent to the agent 300. Notably, the task interceptor 320E is provided in relation to the isolation environment 350, but otherwise may be similar to the task interceptors 320A-D discussed above. The agent 300 checks the policy rules (for example via the policy unit 330 discussed herein) to ensure that access to the requested object 123*a* is allowed and, if granted, the agent 300 replies to the requesting process 120*b* with an impersonation token 124 that has access to the relevant namespace. The thread of this isolated process 120*b* then calls the respective 'create' or 'open' operation using the security context now provided by the impersonation token 124. In this example, the impersonation token 124 is discarded after the create/open operation and the thread reverts back to its original security context 121*b*. As a consequence, only the resultant handle has access to the object, therefore preventing escalated access by that process 120*b* to other objects within the session namespace of the primary user.

Figure 6:
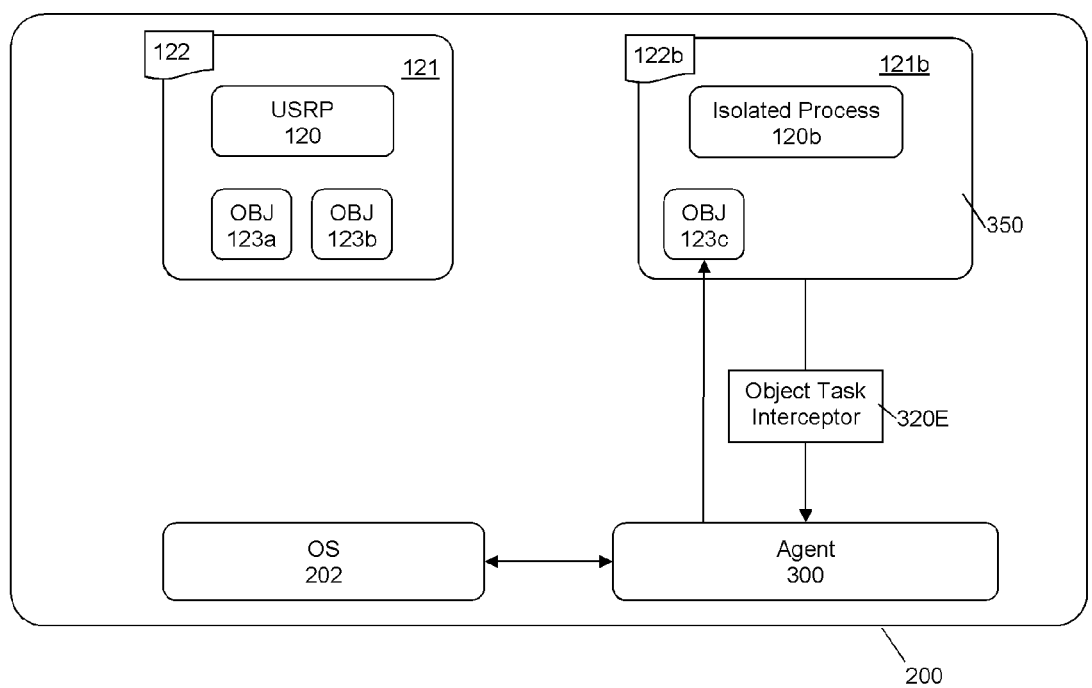
FIG. 6 is a further schematic view of the example computer device while in operation.

FIG. 6 is a further schematic view of the computer device in operation. In this example, the process 120*b* in the isolation environment 350 desires to create a named object 123*c*, which will then exist within the isolation environment. In this situation, the name of the object 123*c* is virtualized by the agent 300, to ensure that the name of this object does not conflict with a named object 123*a* in the session of the primary user having the same original object name. In more detail, a 'create object' request made by the isolated process 120*b* is intercepted by the agent 300 (e.g. by providing an appropriate task interceptor 320E in the isolation environment 350). The name of the requested object is amended by the agent 300 and the agent 300 replies to the requesting process 120*b* with the modified name for the object 123*c*. For example, the name of the object is modified by prepending or appending additional elements, such as the SID of the isolation environment 350. The thread of this isolated process 120*b* then continues with the call to the operating system 202 to create the object with the modified name provided by the agent 300, thus creating the desired named object 123*c* in the isolation environment 350.

When the isolated process 120*b* opens a desired object, the 'open' operation is intercepted by the task interceptor 320E and the modified name is inserted by the agent 300. The open object operation then continues to the operating system 202 using the modified name, thus leading to the object 123*c* within the isolation environment 350. Conversely, it is possible that the open operation will fail, because the desired object 123*c* does not exist within the isolation environment 350. Here, it is possible for the agent 300 to instead open the original named object, e.g. object 123*a*, where the permissions in the policy unit 330 are favourable, using the impersonation token mechanism discussed above in FIG. 5. This open operation thus now reaches the original object 123*a*, such as a system-wide object owned by the operating system 202, for example. Hence, by selectively opening objects using the original name, or the modified name, as appropriate, controlled by the agent 300, access is provided for the isolated process 120*b* either to the local object 123*c* having the modified object name, or, when expressly permitted, to the original named object 123*a*.

This virtualization, using modified names, is significant in ensuring that a particular application (e.g. Adobe Acrobat Reader) is isolated from other instances of the same application within the same session (e.g. other instances of Adobe Acrobat Reader in another isolation environment or in the primary user's context). Notably, many applications use named objects to communicate with one another, or to restrict the number of instances of an application. Hence, controlling access to named objects allows the system to function on a practical level, and achieve the functions desired by the user, while maintaining effective isolation.

Figure 7:
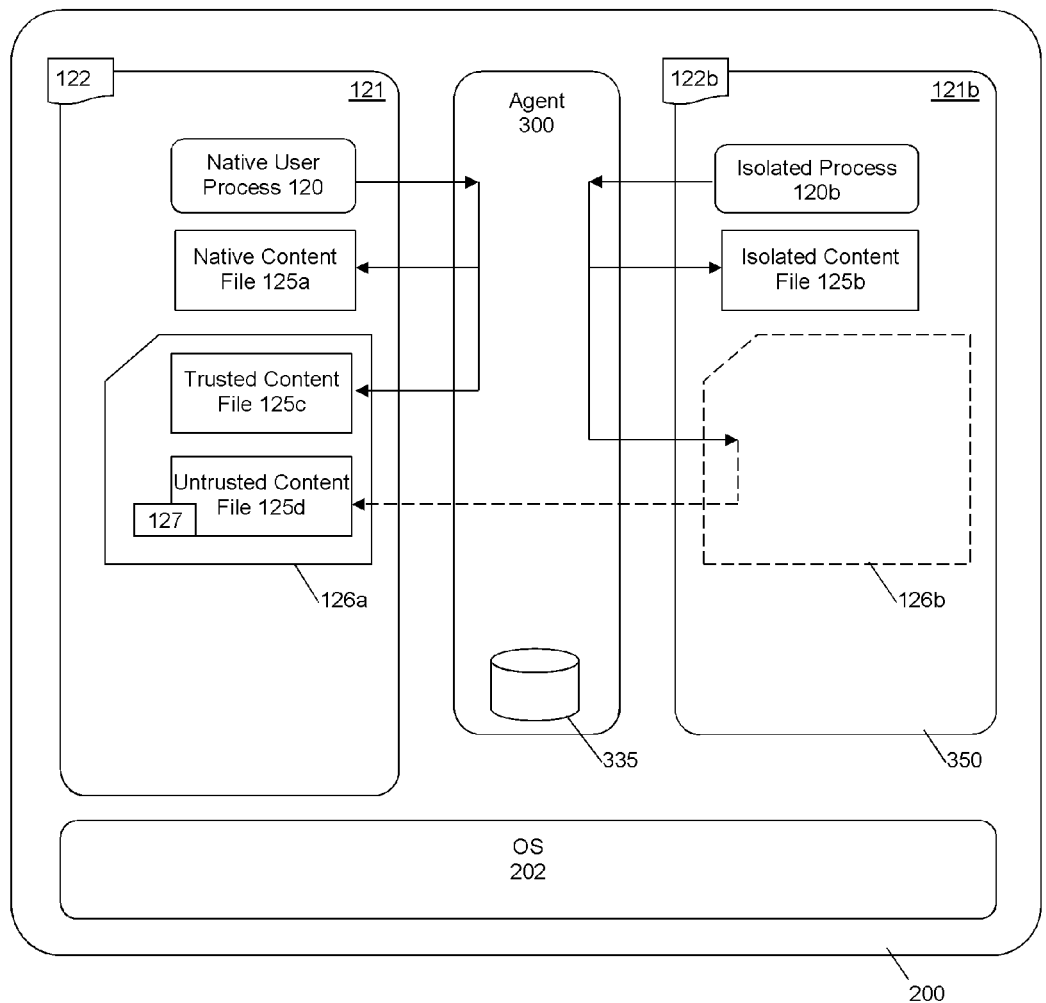
FIG. 7 is a further schematic view of the example computer device while in operation.

FIG. 7 is a further schematic view of the computer device while in operation. In this example, the agent 300 is configured to perform a folder redirection function by mapping certain folders in the isolation environment 350 to respective folders in the primary user context 121. The folder redirection function allows content (e.g. data files) to flow into or out of the isolation environment 350 under the strict control of the agent 300. Notably, the computer device 200 can now provide a more satisfactory user experience in terms of storing and accessing data files which are of interest to the user, while also achieving security by using the task isolation environment 350.

As discussed above, each isolation environment 350 typically persists for only a relatively brief time period. When the relevant temporary user account 121*b* is deleted, any content within that account is likewise deleted. If a file is downloaded by a user into the set of folders associated with the isolation environment 350, then that file will be lost when the temporary user account 121*b* is deleted. The default behaviour of the security mechanism enforced by the operating system 202 further means that the processes 120*b* in the isolation environment 350 cannot save files into any folder outside of that temporary user account, and vice versa.

In one embodiment, the task isolation environment 350 can optionally be configured to redirect one or more folders from the data portion of the temporary user account 121*b* to the profile of the real logged on user. For instance, a "downloads" directory in the isolation environment 350 can be redirected to an "untrusted downloads" folder in the profile of the real logged in user. This folder redirection is suitably handled by the controller 310 within the agent 300. Conveniently, the controller 310 runs in a system security context, i.e. has advanced higher level privileges, which allow the controller 310 to redirect file open requests from one user profile to another, when performing the following steps.

File access operations, including creating and opening files, typically use application programming interfaces (APIs) within the operating system 202. Conveniently, the agent 300 hooks these APIs by a hooking module, suitably implemented as a DLL which is loaded into every process. Thus, all file creation and file open requests directed toward the operating system 202 are redirected instead to the agent 300. The controller 310 may then examine the relevant file open or file creation task against the policy unit 330 to determine the policy result.

In one example, the computer device 200 may be controlled to open a native content file 125*a* stored in any of the folders of the logged-in user profile 121, such as by the user double-clicking an icon in a file explorer process. The agent 300 intercepts the file access request and in this case allows the file access request to proceed as normal toward the operating system 202. The requested file 125*a* is accessed as intended by the relevant native user process 120. Thus, the computer device 200 with the agent 300 installed therein allows the user to continue accessing their own trusted content without any negative interference.

Meanwhile, a first folder 126*a* of the primary user account 121 is mapped to a second folder 126*b* of the temporary user account 121*b*. A file access request toward a subject file in the second folder 126*b* of the subject user account is redirected by the agent 300 to instead be performed in relation to a target file 125*d* in the first folder 126*a* of the primary user account 121. In this example, the mapping may be a one to one mapping between the first and second folders. In other examples, the agent 300 may hold a many to one mapping between folders in the respective user accounts such that a plurality of folders in the secondary user account 121*b* are redirected to a certain folder 126*a* in the primary user account 121, for simplicity and convenience of operation.

Where an untrusted task 120*b* attempts to open a file 125*b* held locally in a folder within the isolation environment 350, then the agent 300 returns control to the hooking module (e.g. the data file task interceptor unit 320), and the relevant file continues to be created or opened natively by the operating system 202 in the temporary profile 121*b*.

Meanwhile, where the untrusted task 120*b* is attempting to open a file that should be redirected, then the agent 300 performs impersonation to impersonate the real logged in user. That is, the agent 300 creates an impersonation token of the real user account 121.

Where the file access in question would overwrite a trusted file (i.e. a file in the user profile which is currently untagged) then an 'access denied' error is returned by the agent 300. Otherwise, assuming that it is safe to proceed, the impersonation token is duplicated into the process hosting the untrusted task in the isolation environment 350. The handle is returned to the task interceptor unit 320 via the hooking module in the untrusted task. The task interceptor unit 320 impersonates the real logged on user using the impersonation token handle and creates or opens the redirected file. The impersonation token is then removed and the token handle is closed. If the file access was successful, in that the relevant file was successfully created or opened, the agent 300 tags the relevant file (described further below). Now, when the untrusted task in the isolation environment 350 attempts to read or write data using this handle, that read or write will automatically target the redirected file.

In one example, the isolated process 120*b* may request a file access to open or create a file 125*b* which is stored in one of the relevant folders associated with the temporary profile 121*b*. The file access request is intercepted by the agent 300 and, in this case, is permitted. The logged-in user may then continue to access the isolated file 125*b* under the secondary user account 121*b* for as long as the isolation environment 350 persists on the computer device 200.

In another example, the isolated process 120*b* may make a file access request to open or create a file in a folder 126*b* of the isolation environment 350 which has been mapped by the agent 300 into a respective folder 126*a* in the set of folders of the primary user context 121. The agent 300 strictly controls which, if any, of the files 125*c*, 125*d*, within the target folder 126*a* may be accessed by the isolated process 120*b*, and determines the level of access which is permitted in each instance (e.g. no access, read-only, full access including read, write and delete privileges). These access privileges may be configured in advance and stored by the agent 300. For example, the access privileges may be stored in the policy database 335 of the policy unit 330. The access privileges are then consulted in response to a relevant file access request.

In one example, a mapped folder 126*a* in the primary user account 121 contains only untrusted files 125*d*. That is, the "untrusted downloads" folder contains only files which have been downloaded via one of the task isolation environments. In this example, access may be controlled at the level of the folder, or individually for each file within the folder.

In another example, the mapped folder 126*a* in the primary user account 121 may contain a mixture of trusted files 125*c* and untrusted files 125*d*. This is more convenient for the user, in that they may now store files obtained from various sources together in one folder. As an example, a single "downloads" or "desktop" folder in the primary user account 121 may contain a plurality of files from a mixture of sources. One or more of the files in this folder may be created or opened by processes 120 operating under the primary user account 121, while one or more other files in the same folder were created or opened by processes 120*b* operating under one of the secondary user accounts 121*b*.

Thus, this folder redirection mechanism enables tasks within the isolation environment 350 to reach selected data files within the profile of the logged-on user under the strict control of the agent 300.

In one example embodiment, an untrusted file 125*d* is provided with a tag 127. Should the tagged file 125*d* later be accessed by the logged on user, such as by the user manually requesting opening of the file using a file explorer program, then the tag set earlier causes the controller 310 of the agent 300 to intervene. Specifically, the controller 310 causes this untrusted (tagged) file 125*d* to be opened instead in the isolation environment 350 from where that file was created, as identified by the tag. If the original isolation environment 350 has meanwhile been deleted, then a new isolation environment 350 may be provisioned and the file opened from the new isolation environment as appropriate, along with a consequential updating of the tag.

In summary, the isolation environment 350 can optionally be configured to allow data files to be redirected from the isolation environment instead to the profile of the real logged on user. For instance, it is desirable to redirect a downloads folder which receives downloaded files during web browsing into a "untrusted downloads" folder within the user's profile, in order to allow the downloaded data files to persist within the users profile, even if the temporary user account of the isolation environment 350 has been deleted by the agent 300. Further, the example embodiments allow the redirected folder to target an existing folder in the real user's profile that contains a mixture of both trusted and untrusted data files, by the tagging mechanism described herein.

Where an application in the user account of the logged on user attempts to open an untrusted (tagged) data file then, optionally, an access denied error is returned to the user application. Thus, a user application is prevented from directly accessing untrusted data files. Meanwhile, the agent 300 may receive notification of the data file access request via the task interceptor units discussed above, and may optionally cause the requested data file to be opened instead within an isolation environment 350.

It is possible to implement file tagging in a number of ways. In a first example, a tag 127 may be placed in an alternate data stream, which has the advantage of leaving contents of the original data file unaltered. This non-intrusive tagging method allows the tagged data files to be viewed or edited even when the agent 300 is removed from the computer device. In one example, the alternate data stream is a feature of NTFS in the Windows™ family of operating systems.

As another option, the tag 127 may be incorporated within the contents of the file, such as by means of a header. Further, the file may be encrypted, so as to prevent opening natively by the ordinary user account. Thus, the file is now only capable of being opened by the agent 300 as described herein.

Suitably, the tag 127 applied to the untrusted data file 125d comprises a task isolation environment identifier which identifies the task isolation environment 350 from which that data file originated (e.g. an environment name and identifier). The tag may comprise a URL from where the file was downloaded. The tag may comprise an email sender identity, such as where the file was saved from an Internet attachment. These and other specific implementations will now be apparent to the skilled person from the discussion herein.

Figure 8:
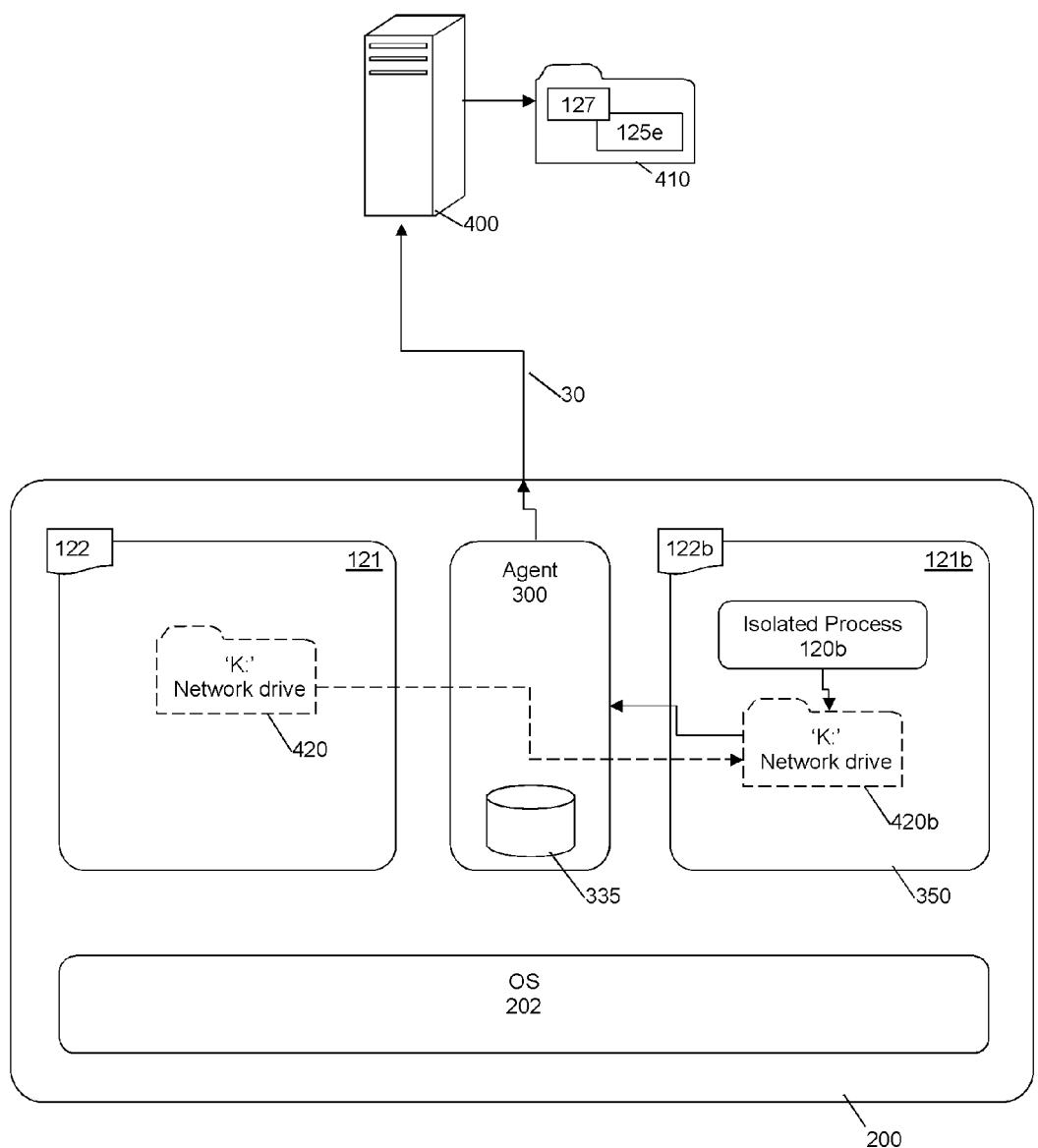
FIG. 8 is a further schematic view of the example computer device while in operation.

FIG. 8 is a further schematic view of the computer device while in operation. In this example, the agent 300 is configured to perform a mapping function for certain network drives.

It is common for users in a business environment to store data files in a centralised, managed network drive. As will be familiar to those skilled in the art, a mapped network drive may be implemented by a shared folder.

A host server device 400 may be coupled to the computer device 200 over a suitable network 30. The server 400 provides access to a shared folder 410 on a suitable physical storage medium. The shared folder 410 is typically mapped to a network drive letter on the computer device 200, such as the drive "K:" being mapped to a network folder location "//server1/folders/sharedfolder123". Conveniently, the mapped network drive 420 is readily accessed when operating the computer device 200. The mapping is typically configured as part of the primary user account 121, e.g. via a script at logon. The mapped network drive 420 improves resilience and security for the stored data, by allowing the stored data to be backed up from the server 400 and preventing loss due to theft or damage of the computer device 200. In one example, a mapped network drive is useful for sharing data files amongst a plurality of users who are each granted access to the same shared folder as a mapped network drive in their respective primary user account.

There is a desire to take advantage of the isolation environment 350 discussed above while also providing access to a mapped network drive 420 on the computer device 200. However, the least-access security principle means that the isolation environment deliberately cannot access important resources such as a mapped network drive.

In one example, provisioning the isolation environment 350 further comprises the step of mapping one or more network drives of the temporary user account 121b according to respective network drives which are already mapped in the primary user account 121. This process may comprise discovering one or more network drives which are already mapped within the primary user account 121. In a Windows™ operating system the function QueryDosDevice may be used to obtain information regarding the current set of device names and their relevant mappings in relation to the primary user account 121. The process may then comprise recreating the relevant network drive mappings in the context of the temporary user account 121b. In a Windows operating system, the function DefineDosDevice may be used to define a network drive mapping. The agent 300 is thus configured to provision the new temporary user account 121b with one or more network drive mappings 420b which match one or more of the mapped network drives 420 of the primary user account 121. The agent 300 may be configured, e.g. via an administration interface, to determine the set of network drives which are to be provisioned in each secondary user account 121b, and the respective level of access which is to be permitted.

When the user now operates the computer device via the temporary user account 121b, these automatically provisioned network drive mappings 420b may be presented through the user interface 204. A substantially equivalent operating experience may be achieved, whether the user operates the computer device natively through the primary user account 121 or via a process or application in the secure isolation environment 350. Notably, the user interface may present equivalent information in terms of views of the network drives, so that network drives seen from an explorer window when in the insolation environment 350 are equivalent to a native explorer window. The user interface may consistently present relevant metadata such as information about the network location 410 and the server 400 where the drive is hosted, and information about a current connection state of the network drive.

In one example, access to the mapped network drive 420 or 420b is controlled by the agent 300 is a similar manner to that described above for a locally hosted file or folder. Access permissions may be defined in advance and enforced by the agent 300 upon each intercepted file access request. When an isolated task 120b is permitted to access a file 125e on a mapped drive 420b, an impersonation token 124 of the primary user account 121 is created and used to impersonate the security rights of the primary user account 121 to allow access to the requested file 125e. When permitted, files may be stored onto the mapped network drive 420 as untrusted files in the manner described above. The tags 127 may be used to control subsequent access to the untrusted files 125e, as previously described herein.

In a corporate environment, multiple users may be given access to the same mapped network drive 420. Suitably, each client device 200 comprises the agent 300 which operates in the manner described herein and thus allows safe access to the untrusted files 125e which may have been stored onto the mapped network drive 420 by another user. Each untrusted file 125e may have a tag 127 as described above. The agent 300 detects the tag 127 and, where shared access to the untrusted file 125e is to be permitted, may cause the untrusted file 125e to be opened using an appropriate task isolation environment 350 on the client device 200 of the current user.

Figure 9:
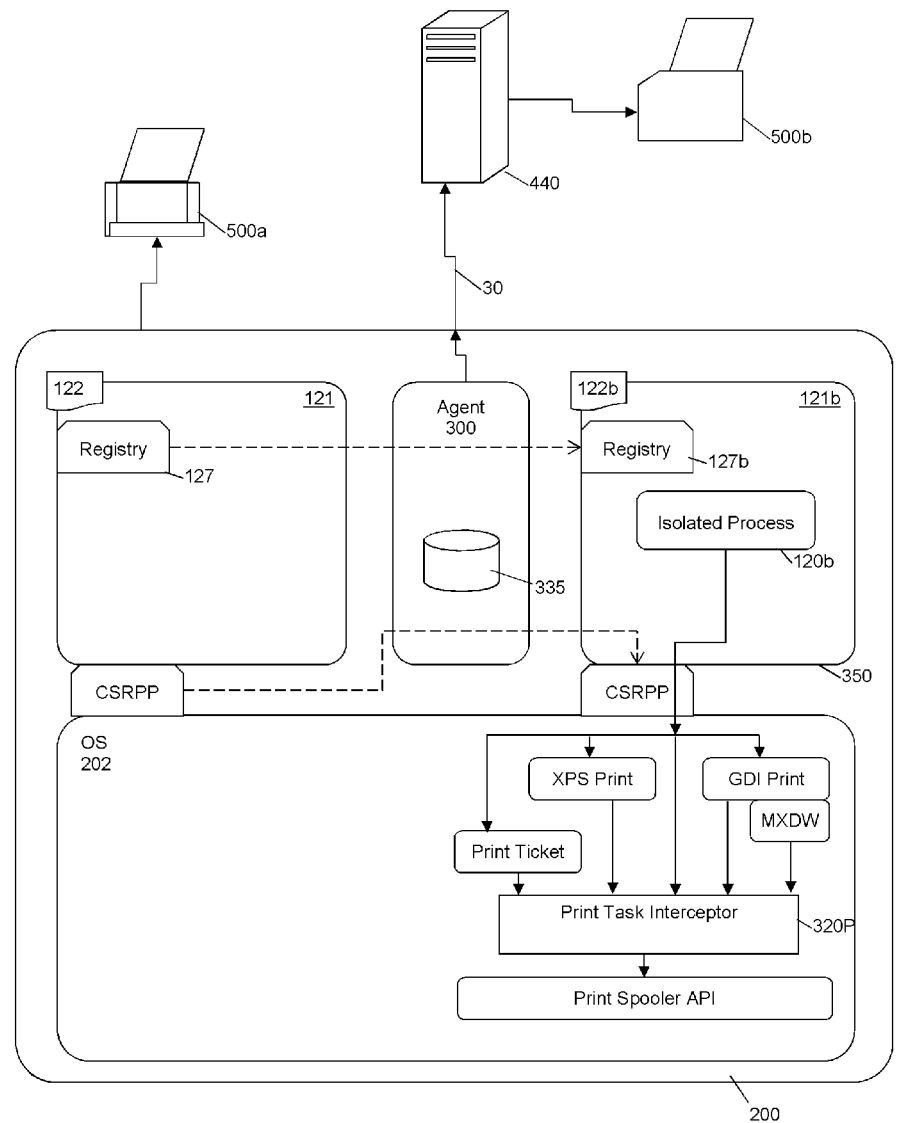
FIG. 9 is a further schematic view of the example computer device while in operation.

FIG. 9 is a further schematic view of the computer device 200 in operation. In this example, the agent 300 controls access from the isolation environment 350 to one or more printers 500.

Printing is an essential function in most business environments. In one example, the printer 500a is a local printer which is directly coupled to the computer device 200. In another example, the printer 500b is a network printer which is made available over the network 30, such as via a print server 440. The computer device 200 may have available a plurality of printers 500, which may comprise a mixture of local and network printers 500a, 500b, as will be familiar to those skilled in the art. Therefore, there is a need now to provide printing functions while also taking advantage of the security enhancements provided by the isolation environments 350 and the agent 300. However, the default isolation mechanisms of the security manager 210 in the operating system 202 will not allow access to printers which are associated with a different user account.

In one example, provisioning the isolation environment 350 may further comprise provisioning access to one or more printers 500. In one example, one or more of the printers which are already available with the context of the primary user account 121 and likewise made available in the context of the temporary user account 121b.

In more detail, the primary user account 121 is assumed to have established a connection to one or more printers 500a, 500b with corresponding printer user preference settings held in the registry 127 of that context. In a Windows™ type environment, the operating system 202 holds further printer-related user settings such as in a Client Side Rendering Print Provider (CSRPP). The agent 300, via the provisioner unit 340, may provision the isolation environment 350 including copying and populating user preference settings of one or more printers from the primary user account 121 into the secondary user account 122. It will be appreciated that such discovery and population functions are in no way trivial. In particular, settings from the registry 127 of the primary user account 121 are discovered and populated into the registry 127b of the temporary user account 121b. The agent 300 may further cause printer settings held elsewhere in the operating system 202, e.g. in the CSRPP, to be populated in relation to the temporary user account 121b, wherein those settings are derived from the existing settings in the primary user account 121. In one example, calling a printer enumeration function of the operating system from the context of the secondary user account 121b causes the relevant settings to be populated by the operating system 202.

In a second stage, the application or process 120b in the isolation environment 350 may attempt a printing related function, such as displaying a list of connected printers. The printer list may be compiled and displayed based upon the provisioned and populated information placed previously by the agent 300 into the context of the secondary user account 121b, including elements such as the registry 127b and other printer related components of the operating system 202 (e.g. CSRPP).

The application or process 120b may then proceed with the printing function, such as commanding a new print job. Here, there is a need to support the interaction of the application 120b with the print services of the computer device 200. In the example environment, the application 120b uses one or more application programming interfaces (API) such as Print Ticket, XPS Print, GDI Print or MXDW (Microsoft XPS Document Writer) to reach a common print spooler API. The print spooler then sends a call to a print spooler service (e.g. spools) such as by using a remote procedure call (RPC). Typically, the print spooler service obtains credentials of the originating client process and then presents those credentials in an onward path of the print service. For example, the spooler service routes the RPC and the appropriate parameters to the appropriate print provider, where the security module 210 performs security checks to ensure that the client process in question has rights to access the printer. However, the isolated process 120b in the temporary user account 121b deliberately does not have those privileges and ordinarily the print request would fail (be denied) by the operating system 202.

In the example embodiments, the agent 300 is configured to intercept a printer service requests, i.e. calls to the printer services within the operating system 202. In particular, the agent 300 may be configured to hook a subset of the functions of the Print Spooler API, using an appropriate printer function task interception module 320P similar to the other task interception modules 320 described above. For example, the functions OpenPrinter, EnumPrinters, DocumentProperties, GetPrinter and StartDoc may be intercepted. The agent 300 may now impersonate the primary user context 121 and provide the credentials of the logged-on user account in place of the temporary user account in relation to the currently called printer function. The agent 300 may thus act as the originator client of a system call to the Print Spooler API, by presenting parameters gained from the intercepted call made by the isolated process 120b in the secondary user account 121b, and providing credentials appropriate to the primary user account 121.

In this example, the agent 300 impersonates the primary user account 121 on behalf of the isolated process 121b which then allows the application (e.g. Adobe Acrobat Reader) running in the task isolation environment 350 to connect to a relevant printer 500a, 500b and complete the desired printing task. The user thus enjoys a continuous and seamless transition between native and isolated operation states, even for complex procedures such as local or network printing. As discussed above, the agent 300 may strictly control which, if any, of the printers are made available to the task isolation environment 350. For the one or more printers which are provisioned to the temporary user account 121b, the agent 300 may then implement a strict control policy to selectively allow or deny each print service request made by any process operating in that context.

Figure 10:
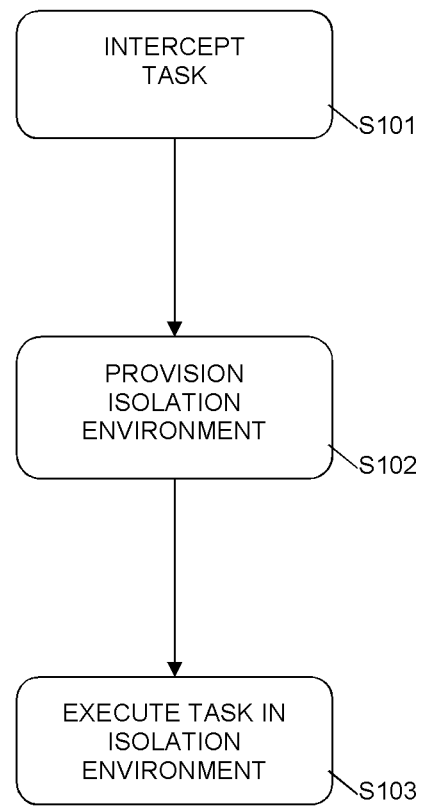
FIG. 10 is a schematic flowchart of an example method of operating the computer device.

FIG. 10 is a schematic flowchart of an example method. In this case, as described in more detail above, the method comprises step S101 of intercepting a task from a primary user account prior to execution of the task by the computer device, wherein the task relates to an untrusted content. Step S102 comprises providing a task isolation environment for executing the task, including provisioning the task isolation environment by programmatically creating a secondary user account on the computer device. Step S103 comprises executing the task in the task isolation environment in relation to the untrusted content. The step S103 may further comprise any of the steps discussed herein. In particular, the step 103 may comprise any of the steps discussed herein in relation to the task isolation environment 350 under control of the agent 300.

In summary, the example embodiments have described an improved mechanism to isolate untrusted content in a computer device. The industrial application of the example embodiments will be clear from the discussion herein.

At least some of the example embodiments described herein may be constructed, partially or wholly, using dedicated special-purpose hardware. Terms such as 'component', 'module' or 'unit' used herein may comprise, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments comprise, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In various embodiments disclosed herein, at least some features of the methods and systems for isolating untrusted content require the use of computer hardware and are impossible to be performed by a human being, whether entirely in the person's mind or whether the person is using a pen and paper. For example, in some embodiments, a computer device or computer system is configured to intercept a task, a file access request, a printer service request, and/or the like, and to perform a related action, such as provisioning a task isolation environment, allowing or denying a file access request, providing impersonated credentials, and/or the like, substantially in real-time. Computer hardware is required for such actions. Further, in some embodiments, the related action is expected to be performed within a relatively short period of time (for example, within 1 millisecond, 5 milliseconds, 10 milliseconds, or 100 milliseconds) to enhance the user experience and/or to enable the performance of the related action to be transparent or substantially transparent to the user of the system. Computer hardware is required for such actions. Further, various embodiments disclosed herein improve the integrity and security of a computer system and result in a computer system that is more efficient and safer to operate than other computer systems. In some embodiments, computer systems as disclosed herein require less memory, disc space, and/or computer processing power than other computer systems.

Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" may mean including the component(s) specified but is not intended to exclude the presence of other components.

Although a few example embodiments have been shown and described, it will be appreciated by those skilled in the art that various changes and modifications might be made without departing from the scope of the disclosure, as defined in the appended claims.

The invention claimed is:

1. A method for isolating untrusted content on a computer device, the method comprising:
    intercepting a task from a primary user account prior to execution of the task by the computer device, wherein the task relates to an untrusted content;
    provisioning a task isolation environment for executing the task, including (i) programmatically creating a secondary user account on the computer device, (ii) determining a printer which is available in the primary user account, and (iii) making the printer available in the secondary user account by populating printer-related user settings in the secondary user account;
    executing the task in the task isolation environment in relation to the untrusted content;
    intercepting, by an agent, a printer service request by the task in the secondary user account in relation to the printer;
    determining, by the agent, whether to allow or deny the printer service request by the task of the secondary user account in relation to the printer;
    providing impersonated credentials of the primary user account by the agent when the printer service request is allowed and allowing the printer service request to proceed using the impersonated credentials; and
    performing a printer related function by the task operating in the task isolation environment to obtain and display a list of connected printers available to the secondary user account, wherein the list of printers is a subset of a list of printers available in the primary user account.

2. The method of claim 1, further comprising performing by the agent the steps of:
    copying one or more user preference settings from a registry of the primary user account concerning the printer; and
    populating a registry of the secondary user account with the user preference settings copied from the primary user account.

3. The method of claim 1, further comprising performing by the agent the step of:
    causing one or more printer related user preference settings held by an operating system of the computer device other than in the registry of the primary user account to be populated in the operating system in relation to the secondary user account.

4. The method of claim 1, further comprising:
    commanding a new print job by the task executing in the task isolation environment; and
    supporting by the agent completion of the new print job by an operating system of the computer device using the impersonated credentials.

5. The method of claim 1, further comprising performing by the agent the steps of:
    hooking a printer service request made by a process executing in the task isolation environment;
    obtaining parameters from the printer service request; and
    presenting the printer service request to a printer service in an operating system of the computer device using the parameters obtained from the intercepted printer service request and the impersonated credentials.

6. The method of claim 5, wherein the printer service request is directed toward a print spooler in the operating system of the computer device.

7. The method of claim 1, wherein the printer is a network printer available to the computing device via a print server, and the impersonated credentials are presented to the print server.

8. The method of claim 1, wherein the printer is a local printer coupled to the computing device.

9. A computer device, comprising:
    a hardware layer including at least a processor and a memory;
    an operating system which performs tasks using the hardware layer;
    a user process operating in a primary user account controlled by the operating system and configured to request a task to be actioned by the operating system, wherein the primary user account comprises a network drive which is mapped into the primary user account;

an agent configured to execute in cooperation with the operating system, wherein the agent is configured to:
intercept the task before being actioned by the operating system and provide task metadata relevant to the intercepted task;
examine the task metadata and selectively output a policy result identifying the task as being an untrusted task;
provision a task isolation environment by (i) programmatically creating a secondary user account on the computer device, (ii) determining a printer which is available in the primary user account, and (iii) making the printer available in the secondary user account by populating printer-related user settings in the secondary user account; and
cause the untrusted task to be executed as an isolated process in the task isolation environment provided by the secondary user account,
wherein the task operating in the task isolation environment is arranged to perform a printer related function by obtaining and displaying a list of connected printers available to the secondary user account, wherein the list of printers is a subset of a list of printers available in the primary user account.

10. The computer device of claim 9, wherein the agent is further configured to:
intercept a printer service request by the task in the secondary user account in relation to the printer;
determine whether to allow or deny the printer service request by the task of the secondary user account in relation to the printer; and
provide impersonated credentials of the primary user account when the printer service request is allowed and allow the printer service request to proceed using the impersonated credentials.

11. The computer device of claim 9, wherein the agent is further configured to:
copy one or more user preference settings from a registry of the primary user account concerning the printer; and
populate a registry of the secondary user account with the user preference settings copied from the primary user account.

12. The computer device of claim 9, wherein the agent is further configured to:
cause one or more printer related user preference settings held by an operating system of the computer device other than in the registry of the primary user account to be populated in the operating system in relation to the secondary user account.

13. The computer device of claim 9, wherein:
the task executing in the task isolation environment is configured to command a new print job; and
the agent is configured to support completion of the new print job by an operating system of the computer device using the impersonated credentials.

14. The computer device of claim 9, wherein the agent is further configured to:
hook a printer service request made by a process executing in the task isolation environment;
obtain parameters from the printer service request; and
present the printer service request to a printer service in an operating system of the computer device using the parameters obtained from the intercepted printer service request and the impersonated credentials.

15. The computer device of claim 14, wherein the printer service request is directed toward a print spooler in the operating system of the computer device.

16. The computer device of claim 9, wherein the printer is a network printer available to the computing device via a print server, and the impersonated credentials are presented to the print server.

17. The computer device of claim 9, wherein the printer is a local printer coupled to the computing device.

18. A computer readable non-transitory storage medium having recorded thereon instructions which, when implemented by a computer device, perform the steps of:
intercepting a task from a primary user account prior to execution of the task by the computer device, wherein the task relates to an untrusted content;
provisioning a task isolation environment for executing the task, including (i) programmatically creating a secondary user account on the computer device, (ii) determining a printer which is available in the primary user account, and (iii) making the printer available in the secondary user account by populating printer-related user settings in the secondary user account;
executing the task in the task isolation environment in relation to the untrusted content;
intercepting, by an agent, a printer service request by the task in the secondary user account in relation to the printer;
determining, by the agent, whether to allow or deny the printer service request by the task of the secondary user account in relation to the printer;
providing impersonated credentials of the primary user account by the agent when the printer service request is allowed and allowing the printer service request to proceed using the impersonated credentials; and
performing a printer related function b the task operating in the task isolation environment to obtain and display a list of connected printers available to the secondary user account, wherein the list of printers is a subset of a list of printers available in the primary user account.

19. The computer readable non-transitory storage medium of claim 18, wherein the instructions, when implemented by the computer device, further perform the step of:
causing one or more printer related user preference settings held by an operating system of the computer device other than in the registry of the primary user account to be populated in the operating system in relation to the secondary user account.

20. The computer readable non-transitory storage medium of claim 18, wherein the instructions, when implemented by the computer device, further perform the steps of:
hooking a printer service request made by a process executing in the task isolation environment;
obtaining parameters from the printer service request; and
presenting the printer service request to a printer service in an operating system of the computer device using the parameters obtained from the intercepted printer service request and the impersonated credentials.

* * * * *